United States Patent
Echeverry Munetones

(10) Patent No.: US 8,603,561 B2
(45) Date of Patent: Dec. 10, 2013

(54) COFFEE EXTRACT HAVING RED FRUITS AND COFFEE AROMA

(75) Inventor: Jorge Alonso Echeverry Munetones, Medellin (CO)

(73) Assignee: Industria Colombiana de Cafe S.A.S., Medellin (CO)

( * ) Notice: Subject to any disclaimer, the term of this patent is extended or adjusted under 35 U.S.C. 154(b) by 0 days.

(21) Appl. No.: 13/005,523

(22) Filed: Jan. 12, 2011

(65) Prior Publication Data

US 2012/0121791 A1    May 17, 2012

(30) Foreign Application Priority Data

Nov. 12, 2010   (CO) .................................. 10 141988

(51) Int. Cl.
    *A23F 5/00*      (2006.01)
(52) U.S. Cl.
    USPC .......................................................... 426/594

(58) Field of Classification Search
    None
    See application file for complete search history.

(56) References Cited

U.S. PATENT DOCUMENTS

| | | | | |
|---|---|---|---|---|
| 4,637,935 | A * | 1/1987 | Kirkpatrick et al. | 426/443 |
| 4,687,671 | A * | 8/1987 | Husain et al. | 426/384 |
| 2002/0142082 | A1* | 10/2002 | Zeller et al. | 426/430 |
| 2003/0170367 | A1* | 9/2003 | Fairhurst et al. | 426/594 |
| 2005/0214433 | A1* | 9/2005 | Hardesty et al. | 426/594 |

FOREIGN PATENT DOCUMENTS

JP          2003204757 A * 7/2003

* cited by examiner

*Primary Examiner* — Humera Sheikh
*Assistant Examiner* — Subbalakshmi Prakash
(74) *Attorney, Agent, or Firm* — Neifeld IP Law, P.C.

(57) ABSTRACT

The present invention relates to the development and obtention of a liquid coffee extract bearing a combined natural coffee and red fruits aroma which modifies the aroma but keeps unaltered the coffee taste.

5 Claims, 3 Drawing Sheets

COFFEE EXTRACT HAVING RED FRUITS AND COFFEE AROMA

CROSS REFERENCE TO RELATED APPLICATIONS

This application claims Priority to Columbian application: 10 141988 filed Nov. 12, 2010, country Columbia, having applicant "INDUSTRIA COLOMBIANA DE CAFÉ S.A.S." and inventor "Jorge Alonso Echeverry Munetones", the contents of which are fully incorporated by reference herein.

FIELD OF THE INVENTION

The present invention relates to a 100% natural coffee extract having outstanding features concerning quality, aromatic profile and innovation, as well as to a process for producing such extract. Specifically, the invention relates to the development and obtention of a liquid coffee extract having 100% natural combined coffee and red fruits aroma which does not modify the coffee taste.

BACKGROUND OF THE INVENTION

In the field of coffee derivative products, it is very important to have desirable taste and aroma characteristics thereof. Said characteristics are commonly associated with high quality coffee products. A great amount of the efforts made in the state of the art concern this aspect, that is, improving the aroma and taste of coffee derivative products. The general market is highly demanding and dynamic and therefore, it requires products having a higher quality and a high innovative component.

The patent application FR2759254 relates to a method for producing a beverage having coffee and fruits taste comprising a) grinding coffee beans and depositing same in a container (4); b) making fruit pulp and optionally c) adding other colors and aroma while drying the fruit and finally d) grinding the dried fruit until powdered and depositing in another container (11). Finally, the powdered fruit and grounded coffee are mixed (15) and packed (16). (FIG. 1)

However, said document does not disclose an extract having coffee and red fruits combined aroma which maintains unaltered coffee taste.

On the other hand, patent application CN1059452 discloses a formulation and preparation of a fruit based beverage which uses the skin and residual juice obtained during coffee processing in order to obtain a syrup which is used as raw material in the food and beverages industry.

The application US2006035000 is addressed to a soluble coffee product having improved aroma and taste comprising particulate soluble coffee and non-flavored coffee oil wherein the coffee oil has a particle size from 0.1?m to 25?m.

On the other hand, application EP 1 527 695 provides a non-alcoholic coffee beverage comprising a fermented coffee component comprising a coffee aroma with flower and/or fruit notes due to coffee flavor fermentation. However, this application does not disclose a beverage having red fruits aroma obtained from the use of natural strawberry and blackberry pulp.

Accordingly, there is still the need of providing a liquid coffee extract having a natural combined coffee and red fruits aroma which modifies the aroma but holds intact coffee taste.

SUMMARY OF THE INVENTION

The invention relates to the development and obtention of a liquid coffee extract having a combined natural coffee and red fruit aroma which modifies the aroma but maintains intact the coffee taste.

The extract of the present invention is used by the general public as part of the mixture for ready to drink coffee beverages (RTD).

One aspect of the present invention provides a 100% natural coffee extract having outstanding characteristics concerning quality, aromatic profile and innovation, fundamental requirements for ready to drink beverages (RTD).

Specifically, the invention provides a totally new product, that is, a coffee extract having the advantage of providing a coffee and red fruits natural aroma which modifies the aroma keeping unaltered the coffee taste. Such product has not been disclosed within the state of the art.

Another aspect of the present invention is to provide a method for obtaining a liquid coffee extract having combined coffee and red fruits aroma.

DETAILED DESCRIPTION OF THE INVENTION

Figure 1:
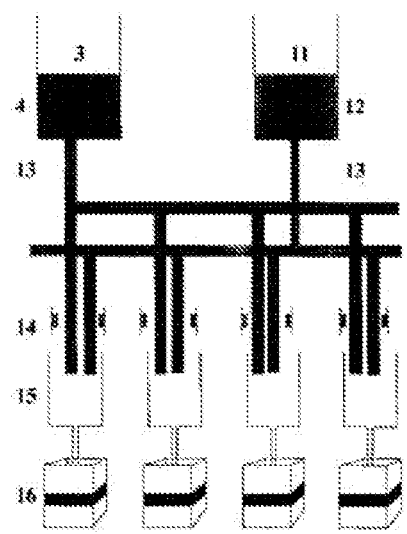
FIG. 1 is a schematic of a system used for producing a powdered fruit and grounded coffee are mixed.

The purpose of the present invention is to provide a 100% natural extract, using as raw materials fruits and coffee, for obtaining coffee extract and red fruits and coffee aromas. To that effect, the following concentration and operation ranges were used based on the working experience of the company in processing coffee and the obtention and recovering of aromas:

Raw Material

| | |
|---|---|
| Green arabica coffee | 100% |
| Green robusta coffee | 100% |

Green *arabica* and robusta coffee mixture

| | |
|---|---|
| Natural Strawberry pulp | 100% natural |
| Natural blackberry pulp | 100% natural |

Several features of the present invention are described below but in any way these should be read as limitative thereof.

100% *Arabica* coffee, 100% Robusta coffee and a mixture of 100% green *Arabica* and Robusta coffee mixture were used as raw materials, distributed as follows:

*Arabica* Coffee

The *Arabica* variety originally comes from Ethiopia and comprises a great number of varieties, which are only differentiated in that they grow in different types of soils, at different altitudes, in different climates or because they are subjected to different influences. Some of them are: Typica, Java, Bourbon and Criollo.

In general, the *Arabica* coffee tree grows at altitudes between 800 to 2000 meters over sea level and is cultivated in plantations. The *Arabica* coffee obtained from these plants, has caffeine levels from 1% to 1.5% and even less, which is a substantial difference from robusta coffee having levels of 3%.

Robusta Coffee

Robusta variety s one of the species of *Canephora*, but due to its worldwide importance is so identified as *canephora* and robusta. The outstanding varieties are Comilon, Kouilloi, Niaouili, Uganda.

The main crops are located in zones of Africa, Vietnam, Indochina and Brazil. These are coffee having a greater content of caffeine, from 2% to 4%. They show a yellowish bean and have a cereal scent. Roasting is normal and produces a strong coffee, having great body, dark color and strong taste with a bitter point which binding to palate. It is a coffee usually non-washed dry treated, which possibly contains soil stuck in the clefts and other defects.

*Arabica* and Robusta Coffee Mixture

Different types of mixtures can be prepared, with higher Robusta content when a bitter coffee with more body is wanted and mixtures with *Arabica* predominance if a more aromatic and smooth coffee is wanted.

Red Fruits

100% Natural strawberry and blackberry fruit pulps are used, having quality seal and with no additives.

Concerning the equipment, at a laboratory level, state of the art well known equipments were used for characterization and quality control of the obtained aromas and extracts; colorimeter, pH meter, Centrifuge, Titrator, Refractometer, Gas Chromatograph-mass spectrograph (GCMS), aqueous activity meter and microbiological measurement equipments.

At pilot level, a digital rotary evaporator was used for aroma obtention and a 33 kg coffee soluble solids per hour pilot extraction plant was used for the extract obtention.

At industrial level, a distillation tower was used for the obtention of coffee and red fruits aromas and a 330 kg coffee soluble solids per hour industrial extraction plant, coffee clarifiers and rotary evaporators were used for the obtention of the extract.

In order to perform the sensory analysis, two experienced panels in tasting coffee extract and aromas were used.

Roasting

An industrial drum coffee roasting equipment with a load capacity from 200 to 500 Kg of coffee was used to carry out the roasting process. A cycle time from 10 to 15 minutes at a quenching temperature from 180° C. to 220° C. was used. A decrease in weight of 15-25% and a hot air system were used.

Pilot Extraction

A solid liquid coffee pilot extractor through a series of percolators using water as the extractor liquid was used for the pilot extraction. The extraction temperature was between 150° C. to 200° C. and a water flow between 250 and 350 liters/hour.

The vapor pressure was between 8 and 14 bar and the ground coffee load temperature was between 25° C. and 35° C.

Industrial Extraction

A solid liquid industrial coffee extractor, through a series of percolators and using water as the extracting liquid, was used for the industrial extraction according to the present invention. An extraction temperature between 150° C. to 200° C. was used and a water flow between 2500 and 3500 liters/hour was used according to the invention. The vapor pressure was, according to the invention, between 8 and 14 bar and the ground coffee load between 250 to 300 Kg and a yield of 25 to 45% was obtained.

Also, an industrial evaporator was used at a temperature between 40° C. to 70° C. and a pressure between 4-5 bar and a flow of 1500 to 2500 liters/hour, for extract production according to the invention.

A rotary evaporator at a temperature between 50° C. and 70° C., a vacuum pressure of 95 to 100 mbar and 80 to 100 rpm, was used for extract production in the present invention.

The industrial distillation tower was set at a temperature from 80° C. to 100° C. and a flow of 60-100 l/hour.

Selected final mixture of red fruits and coffee for distillation

| Final mixture | Percentage |
| --- | --- |
| Coffee extract with 12 to 20% soluble solids (SS) | Selected mixtures of coffee-strawberry-blackberry; 50-25-25, 40-30-30, 60-20-20 |
| Red fruits, (blackberry (5-10%) SS-Strawberry (5-10%)SS) | |

Equipment known to the skilled in the relevant art, such as pHmeter, gas chromatograph, viscometer, refractometer, were used for the instrumental and quality tests of the extract of the present invention such as acidity, pH, sediment, viscosity, water activity and concentration.

The following example shows an embodiment of the present invention but it should not be understood as limiting the invention or the claimed subject matter.

The present invention deals with a coffee extract with added aromas of combined red fruits and coffee which do not change the coffee taste and highlights the 100% natural coffee and red fruits aroma.

*Arabica* or Robusta coffee or *Arabica* and Robusta mixture is used to feed the roasting process carried out in an industrial drum coffee roaster in batches, at a roasting temperature between 180° C. and 230° C., with a decrease in weight between 15 and 25%, a coffee load between 200 and 500 Kg, and a process cycle time between 10 to 15 minutes, using hot air as heating source, the obtained roasted coffee has a humidity less than 6% and a color between 14 and 20 hunterlab.

Then the roasted coffee is passed through the percolation process, at a water input temperature between 160° C. to 186° C., a water flow between 2000 and 3500 l/h, a coffee withdraw between 500 and 1200 Kg/h, an extractor input pressure between 10 to 15 bar, and a diluted extract with a concentration between 10 and 18° Brix (8.33% to 15% soluble solids) and a pH between 4.8 and 5.2 is obtained.

After clarification, a portion of this extract goes into the cryo-concentration process, with an extract feed flow between 600 and 1200 kg/h at a concentration between 10 to 18° Brix (8.33% to 15% soluble solids), a concentrated extract output flow between 400 and 600 kg/h at a concentration between 34 to 42° Brix (28.3% to 35% soluble solids).

Another portion of the diluted extract between 10 to 18° Brix, is mixed with strawberry pulp with 5 to 10% soluble solids and pH between 3 and 4 and blackberry pulp with 5 to 10% soluble solids and pH between 2.5 and 3.5, with the following relations based on soluble solids: Coffee-strawberry-blackberry, 50-25-25, 40-30-30, 60-20-20, 100 kg batches.

These homogeneous mixtures are fed into the distillation tower, at a feeding flow between 50 to 100 l/h, at atmospheric pressure, operation temperature between 90° C. and 100° C. for the distillation process. A combined coffee and red fruits aroma is obtained at a rate of 80 to 120 l/day.

The red fruits and coffee combined aroma shows the following characteristics:

Sensory Profile

Figure 2:
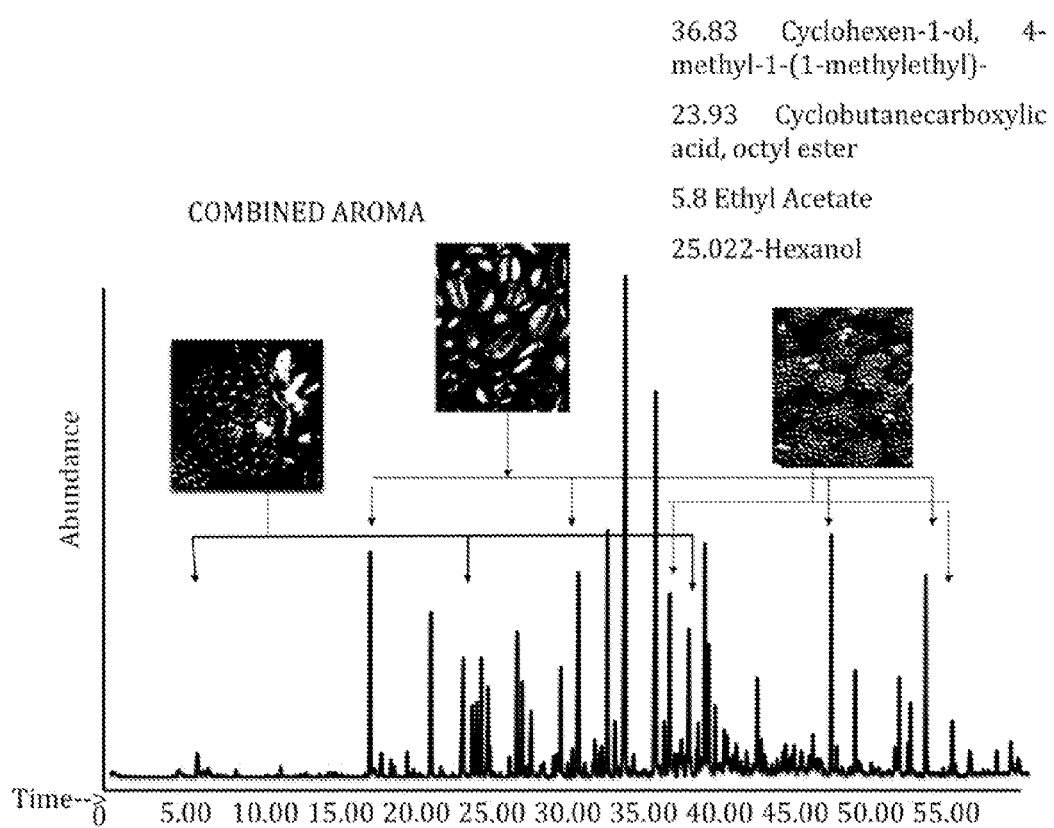
FIG. 2 shows a chromatogram for a red fruits and coffee combined aroma.

Taste: extended post-taste of a beverage having woody notes and nice winy acidity. Aroma: Roasted with almond notes and an intense fruity sweetness and more light red fruits and coffee, showing the following chromatogram unique for this aroma (FIG. 2).

Figure 3:
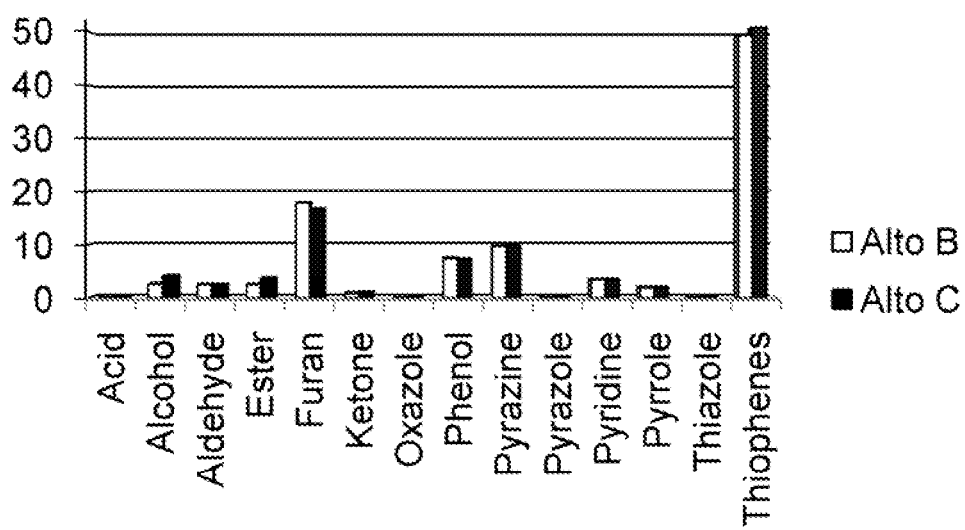
FIG. 3 is a chart showing area standardized percentage of main compounds based upon analysis of gas chromatograph data.

The aroma has the following main compounds, based on the analysis through olfactometry in the gas chromatograph equipment (area standardized percentage), (FIG. 3).

The obtained aroma has the following total aromatic components, obtained through gas chromatography (Table No. 1).

Table No 1. Total aromatic components found in samples Alto B and Alto C

TABLE 1

| Sample | Alto B | Alto C |
| --- | --- | --- |
| 1-Butanol3-methyl-acetate | 0.07 | 0.03 |
| 1-Hexanol | 0 | 1.69 |
| 1 H-Indole, 6-methyl- | 0.17 | 0 |
| 1 H-Pyrazole, 4,5-dihydro-5-methyl- | 0.04 | 0.03 |
| 1 H-Pyrazolo[3 4-d]pyrimidine-4,6(5H,7H-dione | 0.24 | 0.27 |
| 1 H-Pyrrole-(2-furanylmethyl)- | 0.29 | 0.21 |
| 1 H-Pyrrole-2-carboxaldehyde, 1-methyl- | 0.57 | 0.58 |
| 1-Methylcycloheptene | 0 | 0.02 |
| 2(3H)-Furanone, 5-hexyldihydro- | 0 | 0.09 |
| 2,5-Furandione, 3-methyl-4-propyl- | 0.06 | 0.07 |
| 2,6-Octadien-1-ol, 3,7-dimethyl- | 0.08 | 0.08 |
| 2-Acetyl-5-methylfuran | 0.21 | 0.22 |
| 2-Butenal, 2-methyl- | 0.04 | 0 |
| 2-Cyclopenten-1-one, 2 3 4-trimethyl- | 0 | 0.03 |
| 2-Cyclopenten-1-one, 2 3-dimethyl- | 0.19 | 0.18 |
| 2-Cyclopenten-1-one, 2-methyl- | 0.17 | 0.16 |
| 2-Cyclopenten-1-one, 3-ethyl-2-hydroxy- | 0.07 | 0 |
| 2-Furancarboxaldehyde, 5-methyl- | 5.48 | 5.54 |
| 2-Furancarbaxylic acid, 2-phenylethyl ester | 0.45 | 0.39 |
| 2-Furanmethanol | 2.48 | 2.4 |
| 2-Furanmethanol, acetate | 5.68 | 4.36 |
| 2-Furanmethanol, propanoate | 0 | 0.32 |
| 2-Hexenal, (E)- | 0.09 | 0.05 |
| 2-Methoxy-4-vinylphenol | 0.18 | 0.2 |
| 2-Propenoic acid, 3-phenyl-ethyl ester | 0.07 | 0.07 |
| 2-Thiophenecarboxaldehyde | 0 | 0.04 |
| 3 4-Dimethylthiophene | 0.05 | 0 |
| 3-Cyclohexen-1-ol, 4-methyl-1-(1-methylethyl)-, (R)- | 2.42 | 2.17 |
| 4-Methylthiazole | 0.03 | 0 |
| Acetic acid phenylmethyl ester | 0.26 | 23 |
| Benzaldehyde | 0.02 | 0.07 |
| Benzene, 1-ethoxy-2-methyl- | 0.18 | 0.02 |
| Benzene, 1-methoxy-4-(1-methylethyl)- | 0 | 0.13 |
| Benzeneacetaldehyde, alpha.-ethylidene- | 0 | 0.05 |
| Benzoic acid, ethyl ester | 1.99 | 1.27 |
| Bicyclo[3.1.1]hept-2-ene-2-methanol, 6,6-dimethyl- | 0.15 | 0.15 |
| Butanoic acid, ethyl ester | 0.08 | 0.03 |
| Butylated Hydroxytoluene | 0.12 | 0.06 |
| cis-Linaloloxide | 0.15 | 0.19 |
| Cyclobutanecarboxylic acid, heptyl ester | 0 | 2.02 |
| Cyclonent-2-ene-1-one, 2,3,4-trimethyl- | 0.14 | 0.25 |
| Cyclopropane pentyl- | 0.15 | 0.15 |
| Ethanone, 1-(1H-pyrrol-2-yl)- | 0.29 | 0.32 |
| Ethanone, 1-(1-methyl-1H-pyrrol-2-il)- | 0.79 | 0.79 |
| Ethanone, 1-(2-furanyl)- | 2.51 | 2.45 |
| Ethanone, 1-(2-hydroxy-5-methylphenyl)- | 0 | 0.03 |
| Ethanone, 1-(2-pyridinyl)- | 0.27 | 0.25 |
| Ethanone, 1-(2-thienyl)- | 0.04 | 0 |
| Ethanone, 1-(3-thienyl)- | 0 | 0.04 |
| Furan, 2-(methoxymethyl)- | 0.24 | 0.2 |
| Furan, 2,2-[oxybis(methylene)]bis- | 0.73 | 0.7 |
| Furfural | 2.21 | 2.16 |
| Hexanoic acid, ethyl ester | 0.05 | 0 |
| Nonanoic acid | 0.05 | 0.06 |
| Octanoic Acid | 0.08 | 0 |
| Oxazole, trimethyl- | 0.05 | 0.06 |
| Phenol | 0.95 | 0.94 |
| Phenol, 2,3-dimethyl- | 0 | 0.05 |
| Phenol, 2,4-dimethyl- | 0.05 | 0 |
| Phenol, 2,5-dimethyl- | 0.06 | 0 |

TABLE 1-continued

| Sample | Alto B | Alto C |
| --- | --- | --- |
| Phenol, 2,6-dimethyl- | 0 | 0.06 |
| Phenol, 2-methoxy- | 2.78 | 2.72 |
| Phenol, 2-methyl- | 0.36 | 0.37 |
| Phenol, 3,5-dimethyl- | 0 | 0.06 |
| Phenol, 3-methyl- | 0.12 | 0.12 |
| Phenol, 4-ethyl-2-methoxy- | 2.32 | 2.33 |
| Phenol, 4-methyl- | 0.04 | 0.05 |
| Phenylethyl Alcohol | 0.04 | 0.04 |
| Pyrazine | 0.18 | 0.16 |
| Pyrazine, 2-(n-propyl)- | 0.18 | 0.17 |
| Pyrazine, 2,3-dimethyl- | 0 | 0.24 |
| Pyrazine, 2,5-dimethyl- | 0.72 | 0.71 |
| Pyrazine, 2,6-diethyl- | 0.2 | 0.2 |
| Pyrazine, 2,6-dimethyl- | 0.74 | 0.74 |
| Pyrazine, 2-ethenyl-5-methyl- | 0 | 0.21 |
| Pyrazine, 2-ethenyl-6-methyl- | 0.2 | 0.21 |
| Pyrazine, 2-ethyl-3,5-dimethyl- | 0.43 | 0.25 |
| Pyrazine, 2-ethyl-3-methyl- | 0.81 | 0.81 |
| Pyrazine, 2-ethyl-5-methyl- | 0.77 | 0.79 |
| Pyrazine, 2-ethyl-6-methyl- | 1.38 | 1.4 |
| Pyrazine, 2-methyl-5-propyl- | 0.07 | 0.06 |
| Pyrazine, 3-ethyl-2,5-dimethyl- | 0.88 | 0.89 |
| Pyrazine, ethyl- | 1.24 | 1.2 |
| Pyrazine, methyl- | 1.85 | 1.77 |
| Pyridine | 3.09 | 3.17 |
| Pyridine, 3-ethenyl- | 0 | 0.03 |
| Pyridine, 3-methyl- | 0.06 | 0 |
| trans-Furfurylideneacetone | 0.07 | 0.08 |
| Overall Total | 49.27 | 50.73 |

Aromatic Profile

Table 2 shows the comments on the coffee and red fruits aroma profile, using olfactometry and tasting. The obtained results on the nose for coffee are given, with the olfactometry equipment connected to the gas chromatograph, and using a team of trained aroma tasters.

Table No. 2 Olfactometry Results

TABLE 2

| Peak Start | Peak End | Comment | Abstract |
| --- | --- | --- | --- |
| 15.04 | 15.07 | Chocolate | Chocolate |
| 17.32 | 17.47 | Sweet, honey, caramel | Sweet |
| 17.61 | 17.73 | Toasted | Toasted |
| 18.64 | 18.82 | Herbal | Herbal |
| 18.88 | 19.04 | Herbal, almond | Almond |
| 19.11 | 1928 | Butter | Butter |
| 19.27 | 19.33 | Chocolate | Chocolate |
| 19.66 | 19.9 | Almond | Almond |
| 20.2 | 20.51 | Toasted almond peanuts | Almond |
| 20.59 | 20.71 | Toasted | Toasted |
| 21.92 | 22.18 | Almond | Almond |
| 22.6 | 22.74 | Peanuts | Peanuts |
| 22.66 | 22.77 | Herbal | Herbal |
| 25.46 | 25.61 | Herbal green | Herbal |
| 27.07 | 27.11 | Toasted coffee | Toasted |
| 27.22 | 27.26 | Apple | Fruit |
| 27.57 | 27.68 | Almond | Almond |
| 28.06 | 28.54 | Chemical, Toasted | Toasted |
| 28.24 | 28.35 | Toasted rice | Toasted |
| 29.15 | 29.22 | Toasted | Toasted |
| 29.24 | 29.45 | Floral | Floral |
| 29.5 | 29.96 | Chocolate | Chocolate |
| 29.75 | 29.85 | Butter almond | Almond |
| 31.16 | 31.38 | Sweet | Sweet |
| 32.89 | 32.93 | Toasted almond | Almond |
| 34.85 | 35.08 | Sweet, scented, coffee flower, jasmine | Floral |
| 37.55 | 37.94 | Floral, sweet | Floral |
| 42.79 | 43.03 | Scented floral | Floral |
| 4349 | 43.58 | Jasmine | Floral |

According to the sensory profile results and their validation through chromatography and olfactometry, the product has notes of aroma and taste: Toasts, jasmine type floral, chocolate, sweet almonds and fruit.

In addition to the coffee aroma typical compounds, key compounds of the fruit notes for blackberry and strawberry were identified:

36.83 Cyclohexen-1-ol, 4-methyl-1-(1-methylethyl)-
23.93 Cyclobutanecarboxylic acid, octyl ester
5.8 Ethyl Acetate
25.02 2-Hexanol The coffee and red fruits aroma obtained is added in a percentage between 5 and 20% to the cryo-concentrated extract obtained based on soluble solids, with continuous stirring, the obtained extract shows a concentration between 36 and 46° Brix (30-38.32 soluble solids), having a pH between 4.8-5.2, intense coffee and red fruits aroma, mean body and mean acidity.

The obtained extract may have several uses:
Base for RTD beverages preparation
Sent to UHT process and packaging for sale as liquid coffee
Sent to drying process for obtaining powdered coffee having coffee and red fruits aroma
As a base for preparing ice cream having coffee taste and red fruits aroma
As a coffee taste and red fruits aroma base for other food such as: chocolates, sweets and sauces.

The obtained coffee extract having combined coffee and red fruits aroma, has a useful storage life of 12 months freezed at a temperature less than or equal to −22° C.

The invention claimed is:

1. A process for obtaining a coffee extract with aroma balanced between red fruits and coffee, comprising:

a) roasting *Arabica* coffee, Robusta coffee or a mixture thereof at a temperature between 180° C. and 230° C., between 10 and 15 minutes, with a weight decrease of 15 to 25%, b) percolating the roasted coffee at a temperature between 160° C. to 186° C. with an extractor input pressure of 10 to 15 bar, to give a dilute coffee extract having a concentration between 10 and 18° Brix (8.33% to 15% soluble solids), c) cryo-concentrating a portion of the dilute coffee extract (b) to give an output concentration of between 34-42° Brix (28.3-35% of soluble solids), d) mixing another portion of dilute coffee extract (b) with strawberry pulp having 5 to 10% soluble solids and pH between 3 and 4 and blackberry pulp having 5 to 10% soluble solids and pH between 2.5 and 3.5, then distilling the mixture at a temperature between 90° C. and 100° C. to obtain a distillation product containing 4-methyl-1-(1-methylethyl)-cyclohexen-1-ol, cyclobutanecarboxylic acid octyl ester, ethyl acetate and hexanol, then, e) mixing the distillation product of (d) with cryo-concentrated coffee extract of (c).

2. The process of claim 1, wherein the coffee is Robusta.

3. The process of claim 1, wherein a ratio of coffee-strawberry-blackberry is 50-25-25%, 40-30-30% or 60-20-20%.

4. The process of claim 1, wherein blackberry and strawberry contain up to 10% of soluble solids.

5. The process of claim 1, wherein the coffee extract contains up to 40% of soluble solids.

* * * * *